Oct. 7, 1924.

F. JOHNSTON

SELF STARTER

Filed July 19, 1920   3 Sheets-Sheet 1

Witness:
John Enders

Inventor:
Floyd Johnston,
by Clarence J. Loftus
Atty.

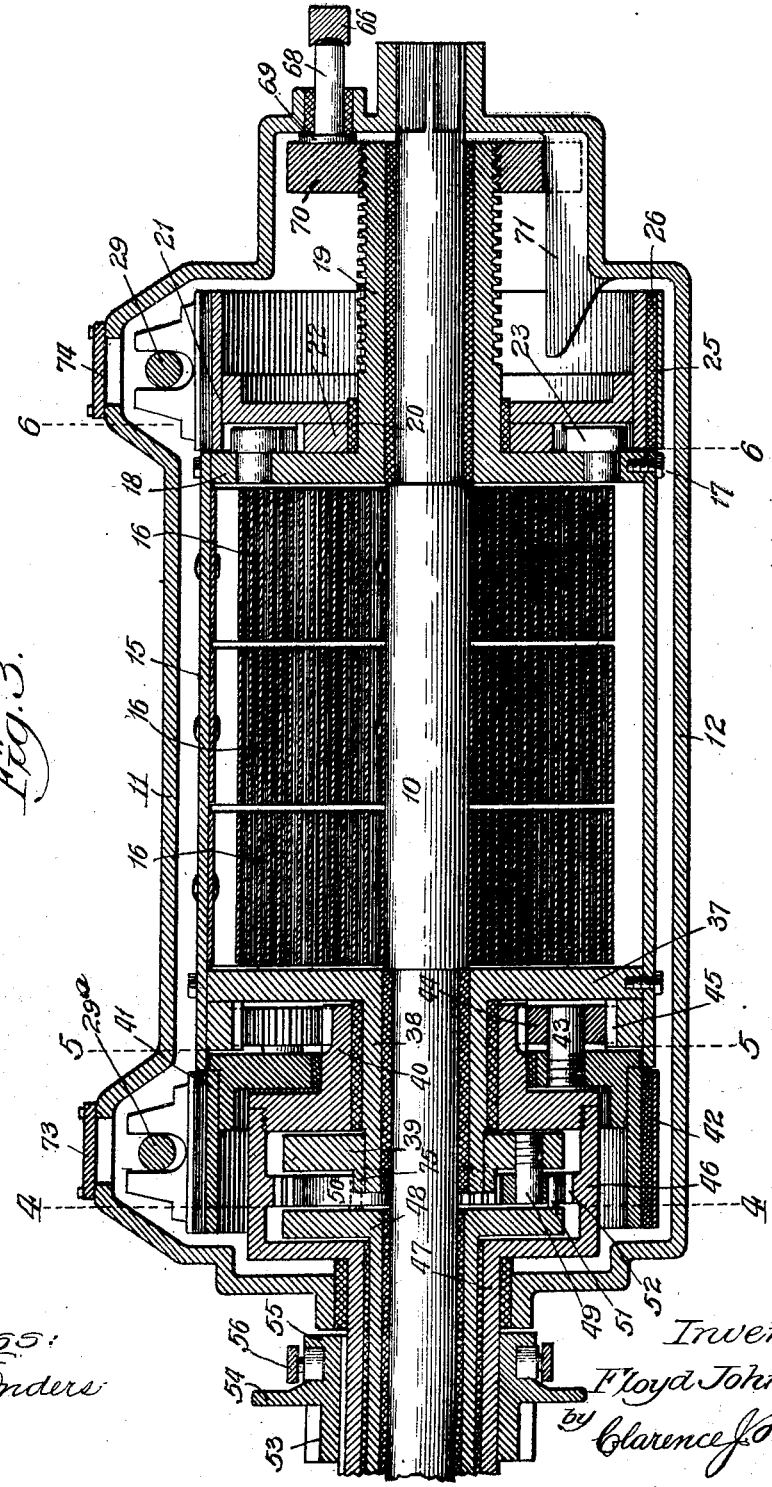

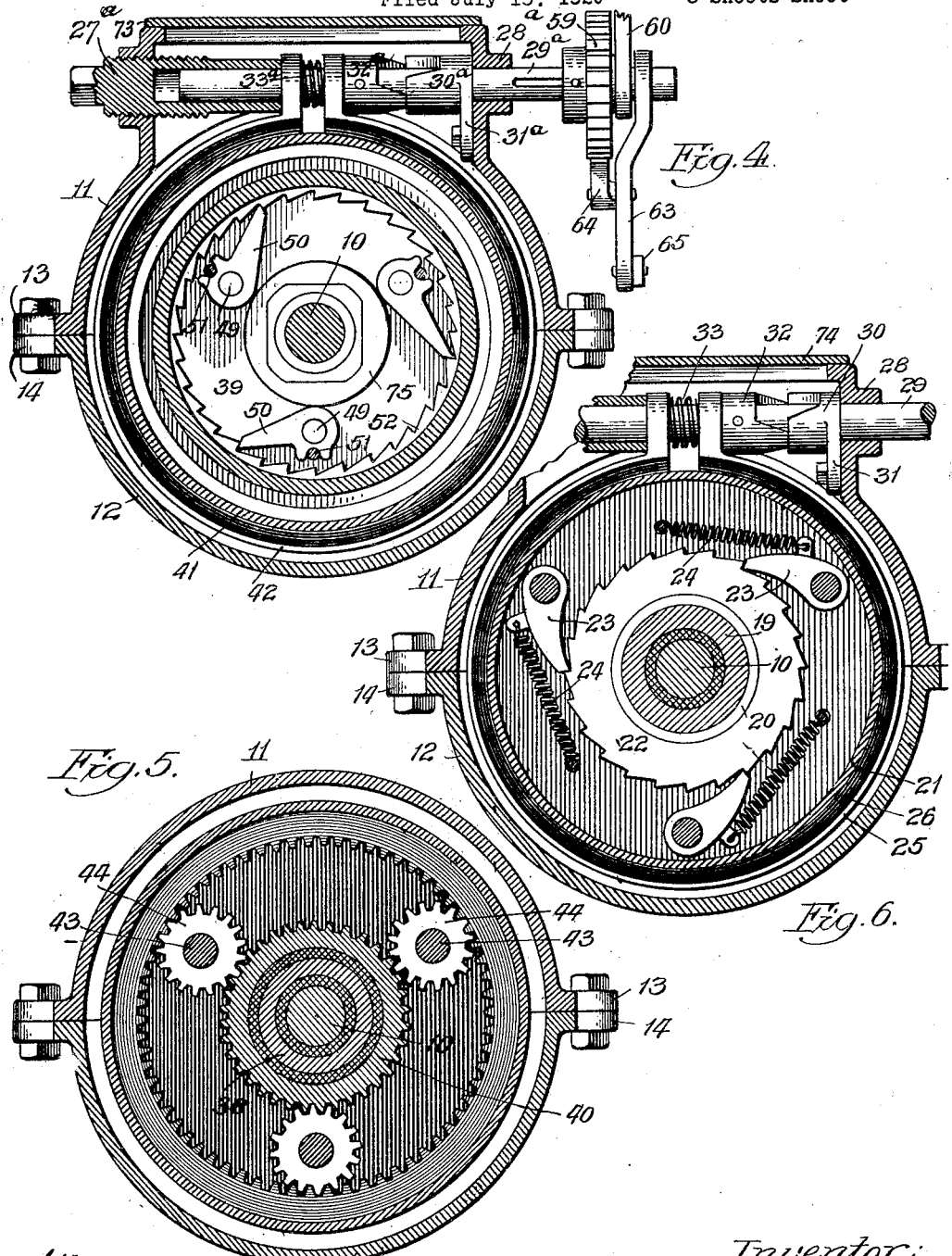

Patented Oct. 7, 1924.

1,511,082

UNITED STATES PATENT OFFICE.

FLOYD JOHNSTON, OF LANESBORO, IOWA.

SELF-STARTER.

Application filed July 19, 1920. Serial No. 397,485.

*To all whom it may concern:*

Be it known that I, FLOYD JOHNSTON, a citizen of the United States, residing at Lanesboro, county of Carroll, and the State of Iowa, have invented certain new and useful Improvements in a Self-Starter, of which the following is a specification.

My invention relates more particularly to a new self-contained mechanical starter for internal combustion engines. It is a further object of my invention to provide a new, novel, simple, useful, efficient, durable and inexpensive device adapted for this purpose. It is a further object to provide a device of this class which is operated by a self-contained spring motor so designed and connected to the engine as to permit the engine through a yieldable connection to automatically restore the energy in the spring motor the moment the engine starts. It is a further object to provide a device of this class which is easily operated and so designed as to give the engine which it starts from a fraction to 20 or more revolutions. It is a further object of my invention to provide a self-contained mechanical device of this class which is controlled in its operation substantially the same as an electric switch on an electric starter. It is a further object of my invention to provide a device of this class in which the spring motor is automatically and positively connected to the engine immediately upon the movement of the spring motor but yieldably connected on the movement of the engine. It is a further object of my invention to provide means for automatically reversing the movement of the spring motor by the engine through a yieldable connection for restoring the energy in the spring motor. It is a further object of my invention to automatically stop the rewinding of the spring motor when such operation has reached a predetermined point and there hold it until released when upon reverse movement it is again automatically connected with the engine. It is a further object of my invention to provide means for automatically throwing the spring motor out of connection on the rewinding movement which means may be readily and quickly adjusted in order to vary the tension or amount of energy to be restored in the spring motor. It is a further object of my invention to provide means for entirely disconnecting the starter from the engine if desired so that it cannot be operated either way. It is a further object of my invention to provide a new and useful one way clutch mechanism for automatically and positively connecting the spring motor with the gear for turning the engine and so designed as to be automatically disconnected when the engine starts operating. A further object is to provide a small compact device of this class entirely enclosed within a casing and arranged in such a manner as to operate in a bath of oil.

The starters now on the market, particularly those which have been attempted to be used in connection with tractors or motor trucks are of the electric or storage battery type in connection with which storage batteries, switches, fuses, wire, adjusters, distilled water, pipe lines, pipe line connection and pumps etc., are used. All of these different parts or features are on the whole delicate and complicated arrangements and when in need of service or repairs require expert mechanisms which are expensive. In the rural districts where tractors are largely used as well as motor trucks and the like such experts are not available electric starters with all their fine, delicate parts may work satisfactorily in factories where they have expert mechanics to look after and take care of them but in farming particularly where it has been attempted to use electric starters on tractors or motor trucks they have been very unsatisfactory if not a failure owing to the fact that they readily and quickly become out of order when subjected to the various strains imposed upon the machine. In addition electric starters are expensive, necessarily so because of the many parts and fine mechanism. My device is intended to and does eliminate all of these disadvantages and objections for I do not utilize any of the parts or devices which cause so much trouble in electric starters. As to the cost of manufacture, my device is considerably less than any other type now on the market especially those used on tractors, trucks and all motors and engines of the medium or heavy class. As to operation it can be operated by a child. It operates automatically; its energy is restored automatically; it is disconnected from the engine automatically; it needs no attention after once installed, as is true with the starters now on the market; it is lubricated automatically as the entire machine works in an oil bath and it is only necessary to replenish the oil once a month or a longer period; it could stand for months at a time without danger of damage; it can be subjected to varying climatic conditions without danger or trouble; it can be installed by any inexperienced mechanic or the usual farmer or motor operator and forgotten about after once installed; it is so designed and arranged that in the event some part of the device should possibly go wrong it is so simple in construction that it would not require a skilled mechanic to remedy the trouble.

The above and other features of novelty, advantages and capabilities will become apparent from the detailed description of the accompanying drawings in which I have illustrated a self-starter embodying one form of my invention, but the construction here shown is to be understood as illustrative only and not as defining the limits of my invention.

Figure 3 is a vertical, longitudinal, sectional view.

Figure 4 is a cross sectional view taken on the line 4—4 of Figure 3.

Figure 5 is a cross sectional view taken on the line 5—5 of Figure 3, and

Figure 6 is a cross sectional view taken on the line 6—6 of Figure 3.

Figure 1:
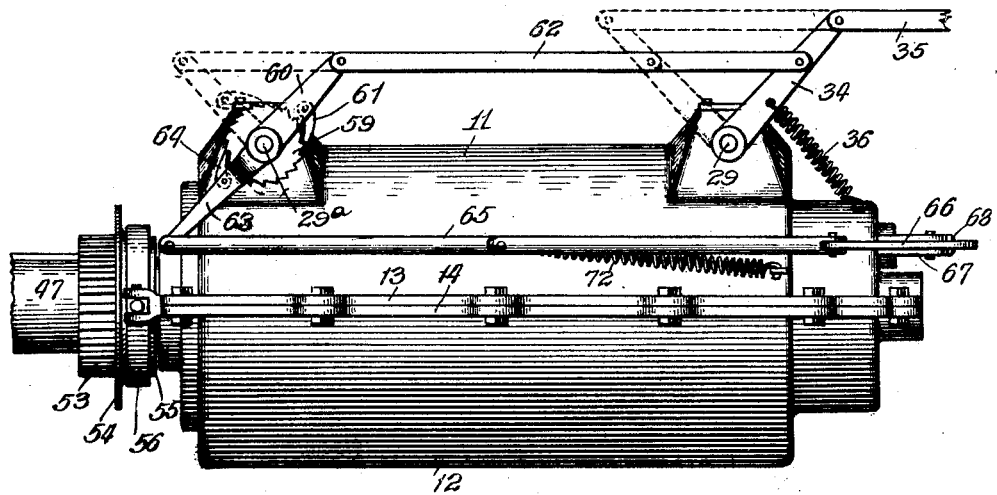
Figure 1 is an elevational view of a starter embodying one form of my invention showing the operating levers in normal position.

Referring to the drawings in detail, in the device illustrated, substantially the entire mechanism, save for the operating levers, is mounted on a non-rotatable shaft "10" within a cylindrical casing which casing comprises upper and lower portions "11" and "12" having outward extending flanges "13" and "14" which flanges are detachably secured together by means of bolts or the like. The casing is securely and rigidly mounted on the frame work of the motor in any suitable manner. The rear end of the shaft "10" is angular in cross section and fits tightly in a corresponding opening in the casing so as to prevent rotation of said shaft. Rotatably mounted within the casing on the shaft "10" is a drum "15". Within the drum "15" and mounted around the shaft "10" is a spring motor "16" consisting of three units, the spring in each unit being rigidly fixed at one end to the shaft and at the opposite end to the drum "15" as best shown in Fig. 3. Secured to the rearward end of the drum by means of bolts or screws "17" is a head "18" which head has formed integral therewith a sleeve "19" extending backwardly to the end of the casing and provided with screw threads over a considerable portion thereof (as best shown in Fig. 3). Rotatably mounted on the sleeve "19" by means of the bushing "20" as shown is a brake disk "21" having a brake shell rigidly fixed thereto, which has formed integral therewith on the forward side a comparatively small ratchet wheel "22". On the rearward side of the head "18" there are mounted a plurality of pawls "23" adapted to mesh or cooperate with the teeth on the ratchet "22" by means of the coil springs "24" on a predetermined movement of the head "18". Both the front and rear brake shells are provided with an external contracting brake "25" which is provided with a suitable brake lining "26". The brake band is of the split type and provided with upwardly extending integral bifurcated lugs. As the shaft, cams for operating the brake band, and the manner of mounting the shaft are identical in both the front and rear, the same reference characters will be applied to the corresponding parts except that I have added the letter "a" to the reference characters which indicate such parts in the front. In the front as in the rear the casing is provided with openings in alignment and also in alignment with the bifurcated lugs of the brake band when positioned. One of these openings is screw threaded in which is mounted an adjustable screw bearing or journal "27" extending inwardly into engagement with one of the lugs of the brake band where such lug is held against movement and the band from revolving around the brake disk. The journal "27" is provided with a central bore in which, and the bearing "28" of the casing, is rotatably and slideably mounted the brake shaft "29". Rigidly fixed to the casing on the inside by means of the arm "31" and bolts as shown is a cam face sleeve "30" provided with an opening in alignment with the bearing "28" through which the brake shaft "29" loosely and slideably passes. Also within the casing there is rigidly fixed to said brake shaft by means of a cotter pin or the like a second sleeve "32" having a corresponding cam face designed to mesh and unmesh with the cam face of the sleeve "30" on each quarter turn of the brake shaft. Surrounding the shaft "29" between the bifurcated lugs is a compression spring "33" for forcing the terminal lugs of the brake band apart.

Figure 2:
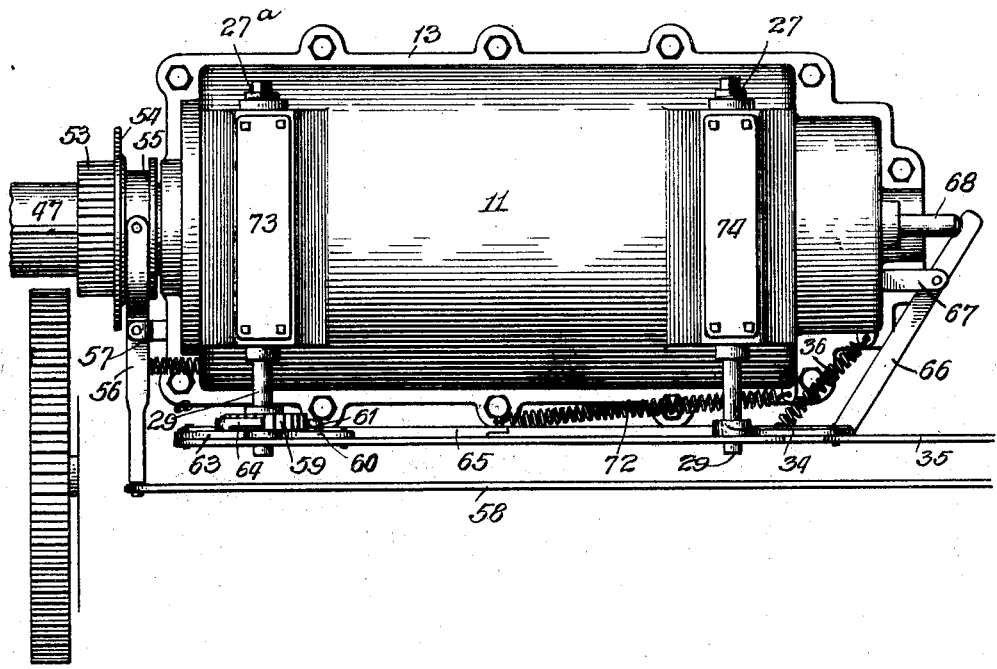
Figure 2 is a plan view of the same showing it adjacent to the gear for connecting with the engine.

Referring now only to the rear brake, the brake shaft "29" which extends outwardly beyond the casing (as best shown in Figs. 1 and 2) has rigidly fixed thereto an arm "34". This arm is pivotally connected to a link "35" which extends rearwardly to the operator and is there connected by any suitable means to a hand or foot operated lever (not shown). A tension spring "36" connects the arm "34" with the main casing for normally holding the rear brake in set position, that is the position the parts would be in before starting the motor.

The forward end of the rotatable drum "15" has rigidly fixed thereto a flanged head "37" by means of the bolts or screws as shown which head has integrally formed centrally therewith a forwardly extending sleeve "38", and is rotatably mounted on the main shaft, by means of the bushing (as best shown in Fig. 3). On the sleeve "38" there is non-rotatably mounted a disk "39", Between the disk "39" and the head "37" there is rotatably mounted by means of the bushing shown a flanged pinion "40" on which pinion forward of the teeth thereof is mounted a brake disk "41" by means of the bushing shown. Fixed to the brake disk is a brake shell "42". Rigidly fixed to the disk "41" are a plurality of (in the illustration shown 3) pins or stub shafts "43" on each of which is rotatably mounted a pinion "44" designed to mesh with the internal gear "45" formed integral with the head "37", and the pinion "40" (as best shown in Figs. 3 and 5). Screwed to the flanged pinion "40" (as best shown in Fig. 3) is a clutch housing "46" which is provided with an integral sleeve or collar "47" by means of which it is rotatably mounted on the flanged friction collar "48" which collar is rotatably mounted on the main shaft "10". Fixed to the disk "39" are a plurality of forwardly extending pins "49" (as best shown in Fig. 4) on each of which pins is rotatably mounted a pawl "50". The head of the pawl is bifurcated to receive the pins "51" (Fig. 4) on the friction collar "48". The pins "51" throw the pawls into engagement with the internal gear "52" on the initial movement of the spring motor when power is being transmitted to the engine and out of engagement when power is transmitted from the engine to the housing "46" through the friction offered by the collar "48". Nonrotatably but slideably mounted on the sleeve "47" is a driving gear "53" having an integral flange "54" which gear is provided with a collar "55" to which collar is pivoted a bifurcated arm "56" by means of the screws shown (Fig. 3) which arm is pivoted intermediate its ends to a bracket "57" (Fig. 2). The bracket is secured to the casing by any suitable means. The outer or free end of the arm "56" is connected to a link or rod "58" which extends backwardly where it is readily accessible to the operator.

Referring now to the front brake (Figs. 1, 2 and 4) the brake shaft "29ᵃ" has non-rotatably mounted thereon by any suitable means a ratchet "59" adjacent to which and rotatably mounted on the brake shaft is a link "60" having a gravity pawl "61" designed to engage the ratchet "59" on a predetermined movement of said link. Pivotally connected to the outer end of said link is a second link "62" which extends forwardly and is pivotally connected to the arm "34". Adjacent to the link "60" is rotatably mounted on the brake shaft "29ᵃ" a second link "63" having its upper portion bent inwardly toward the ratchet wheel (as best shown in Fig. 4) to which upper portion is pivotally connected a spring pressed pawl "64" which pawl is designed to engage the teeth of the ratchet wheel "59" on a predetermined movement of said link. The outer or free end of said link is pivotally connected to a rod "65" which extends rearwardly where it pivotally connects with a lever "66" which lever is fulcrumed on the bracket "67", the bracket being rigidly secured to the main casing by any suitable means. The opposite or free end of the fulcrumed lever "66" is provided with a notch or groove designed to engage with the rounded head of the plunger "68". The plunger "68" is slideably mounted (Fig. 3) by means of the bushing in the bearing or opening in the end of the casing. The end of the plunger within the casing is provided with a flat head "69". Mounted on the sleeve "19" within the casing is a screw threaded travelling block "70" which block is provided with a groove near its lower side to receive the flange "71" formed integral with the lower portion of the casing. When the sleeve "19" is rotated the block "70" is caused to travel thereon and is held against rotation by the flange "71" along which it slides. The plunger "68" is forced outwardly by the travelling block on a predetermined movement of the sleeve "19" and inwardly by the tension spring "72" through the connections therebetween.

To permit ready access to the brake band connections I provide readily removable plates "73" and "74" detachably secured to the casing by means of bolts or the like, each of which if desired may be provided with an oil receiving opening for pouring oil into the apparatus. In actual operation the device is partially filled with oil which finds its way through the heads, along the main shaft and between the gears and disk, so that all the movable parts operate in a bath of oil.

The operation of the device illustrated is as follows:

Assuming that the parts are in the position shown in Fig. 1 and that the starter is mounted on the frame work of the motor which it is desired to start and that the energy has been previously stored up in the spring motor of the starter the operator first throws the slideable clutch "53" into mesh with the driving mechanism which connects with the motor shaft. He then pushes forward, either by a foot or hand operated lever, the link "35" which throws the arm "34" over to the position shown in dotted lines (Fig. 1) thus rotating the rear brake shaft "29" a quarter turn and bringing the cam faces of the sleeves "32" and "30" into mesh releasing the rear brake. It is only necessary to move the arm "34" a short distance for the cam surfaces are so arranged as to mesh at every quarter turn of the brake shaft. As the link "35" is moved forwardly the links "60" and "62" are also given a corresponding forward movement but owing to the fact that the link "60" is rotatably mounted on the front brake shaft it moves forwardly without affecting the front shaft as the pawl "61" slides idly over the ratchet teeth.

The moment the rear brake is thus released the spring motor causes the brake drum or cylinder "15" to revolve or rotate around the main shaft carrying with it the front and rear drum heads "37" and "18" during which operation the front drum head 37 causes disk 39 to rotate in the same direction because of its non-rotatable mounting upon sleeve 38. The moment the disk starts rotating the pawls "50" carried thereon are engaged in their bifurcations or slots by the pins "51" on the friction collar "48", the collar at that moment being at rest. Owing to the slight frictional resistance which it offers, in starting, it, through the pins "51", throws the pawls "50" into mesh with the internal gear "52" on the clutch housing "46" thus causing the housing to rotate through a positive connection in one direction which housing, through its sleeve "47", drives the slidable but non-rotatably mounted driving clutch "53" which driving clutch or gear through a suitable connection, turns the motor shaft (not shown). Immediately upon starting the operation the sleeve "19" of the head "18" causes the travelling block "70" to move inwardly which allows the plunger to be forced inwardly by the tension spring "72" by which the link "63" is shot rearwardly for a purpose presently to be described. The moment the engine starts the lever connecting with the link "35" is released, the tension spring "36" immediately sets both the front and rear brakes. The slidable driving clutch or gear "53" drives the clutch housing "46". As the engine starts driving the clutch housing the pins on the frictional collar "48" through the friction offered by it automatically throws the pawls "50" inwardly out of engagement with the internal gear "52". The driving action of the housing "46" is transmitted directly to the pinion "40" which pinion in turn drives the small pinions "44". These pinions during this operation are being held against revolving or travelling around the pinion "40" by virtue of the fact that the front brake is set. Therefore, the small pinions "44" in turn drive the internal gear "45" on the head "37" thus revolving the drum around the stationary shaft in an opposite direction for restoring energy in the spring motor. From this it will be seen that when the spring motor is starting the engine there is a positive connection through my new and novel clutch arrangement but when the motor is restoring energy there is a yieldable connection through a different path as a result of which there is no chance of the engine shaft breaking any of the parts. To prevent the pawls "50" from being thrown too far out of the path of the teeth of the internal gear "52" when the engine starts driving the clutch "53", I provide a flange or collar "75" on the disk "39" (as best shown in Figs. 3 and 4) to limit the inward movement of the pawls. During the rewinding or the operation of restoring energy the rotation of the screw threaded sleeve on the head "18" causes the travelling block "70" to travel outwardly engaging the plunger "68" which in turn through its lever and link connections forces the link "63" forwardly which in turn through the pawl and ratchet connection turns the front brake shaft a quarter turn and releases the front brake so that it is again ready for use while the rear brake through the disk "21" and the pawl and ratchet connection holds the brake drum from revolving until the rear brake is again released.

To make it more clear as to the operation of the brakes the front brake is normally released while the rear brake is normally set. When it is desired to utilize the device by moving the lever "35" forwardly the rear brake is released and the link "60" is thrown forwardly so that when the engine is started and the link "35" pulled backwardly both brakes are set. In order to automatically release the front brake when the spring motor has been sufficiently wound by the engine and to put the starting device in condition for use, the auxiliary automatically operated front brake mechanism has been provided. This as before pointed out consists of the traveling block "70", plunger "68", lever "66", link "65", link "63", spring pressed pawl "64" and tension spring "72". When the starter is thrown in operation the auxiliary mechanism is in the position shown in Figs. 1 and 2. Therefore, while the starter is cranking the engine the sleeve "19" draws the traveling block inwardly permitting the tension spring "72" to draw the link "63" rearwardly. During this movement it does not effect the front brake shaft as it is rotatably mounted thereon and its pawl simply slides idly over the gear teeth but when the engine starts restoring energy in the spring motor the opposite rotation of the sleeve "19" causes the traveling block to move outwardly forcing the plunger "68" with it which plunger through the lever and link connection forces the link "63" forwardly during which operation through the pawl and ratchet connection the front brake shaft is rotated substantially a quarter of a turn automatically disconnecting the drum from the engine by releasing the front brake thus putting the parts in condition for again starting the engine. From this arrangement it will be seen that I have provided means for automatically successively setting and releasing the front brake and thereby automatically successively making and breaking the driving connections through which power is transmitted from the engine to the spring motor.

It will also be seen from the mechanism shown and described that the operator, thru the rear brake, can control the energy in the spring motor to a fraction of a revolution. This is an important feature in cold weather or when the internal combustion engine is in poor condition for the operator may give the engine one or two turns, stop it by merely releasing the lever to make such adjustment as may be desired, and then press the control lever and give the engine such additional turns or fraction of turns as may be desired.

From the foregoing it is apparent that I have produced a self-contained mechanical starter for internal combustion engines, which possesses to the fullest extent all of the foregoing and many other inherent advantages.

I claim:

1. In a starter, the combination of a stationary shaft, a drum rotatably mounted thereon, a spring motor for operating the drum a front head for the drum, positive driving connections driven by and automatically put in operative relation by the rotation of the drum, separate driving connections for rewinding the drum, a front brake for yieldingly holding the latter connections in operative relation, automatically operated means for successively setting and releasing said brake for making and breaking the latter connections, a rear brake for normally holding the drum against rotation to retain the stored up energy and lever operated means for releasing the rear brake said means on reverse movement being adapted to set both front and rear brakes simultaneously.

2. In a device of the class described, a stationary shaft, a drum rotatably mounted on said shaft, a spring motor for operating said drum, a front head fast to the drum, a driving member, a positive automatically operated clutch mechanism between the driving member and head, a yieldable connection between the driving member and head and an automatically operated brake for yieldably holding the latter connections in operative relation while the drum is being driven by the power transmitted through the driving member.

3. In a device of the class described, a stationary shaft, a drum rotatably mounted on said shaft, a spring motor for operating said drum, a front head fast to the drum, a driving member, a positive automatically operated clutch mechanism between the driving member and head, a yieldable connection between the driving member and head, an automatically operated brake for yieldingly holding the latter connections in operative connection while the spring motor is being rewound by the power transmitted through the driving member, and means operated by the rewinding rotation of the drum for automatically releasing the front brake when the spring motor has been rewound to the desired point, thereby automatically disconnecting the drum from the rewinding action of the driving member.

4. In a device of the class described, a stationary shaft, a drum rotatably mounted on said shaft, a spring motor for operating said drum, a front head fast to the drum, a driving member, a positive automatically operated clutch mechanism between the driving member and head, a yieldable connection between the driving member and head, an automatically operated brake for yieldingly holding the latter connections in operative connection while the spring motor is being rewound by the power transmitted through the driving member, means operated by the rewinding rotation of the drum for automatically releasing the front brake when the spring motor has been rewound to the desired point, thereby automatically disconnecting the drum from the rewinding action of the driving member, and a rear brake for yieldingly holding the drum against rotation in an unwinding direction.

5. In a device of the class described, a stationary shaft, a drum rotatably mounted on said shaft, a spring motor for operating said drum, a front head fast to the drum, a driving member, a positive automatically operated clutch mechanism between the driving member and head, a yieldable connection between the driving member and head, an automatically operated brake for yieldingly holding the latter connections in operative connection while the spring motor is being rewound by the power transmitted through the driving member, means operated by the rewinding rotation of the drum for automatically releasing the front brake when the spring motor has been rewound to the desired point, thereby automatically disconnecting the drum from the rewinding action of the driving member, a rear brake for yieldingly holding the drum against rotation in an unwinding direction, and lever operated means for releasing the front brake.

6. In a device of the class described, a stationary shaft, a drum rotatably mounted on said shaft, a spring motor for operating said drum, a front head fast to the drum, a driving member, a positive automatically operated clutch mechanism between the driving member and head, a yieldable connection between the driving member and head, an automatically operated brake for yieldingly holding the latter connections in operative connection while the spring motor is being rewound by the power transmitted through the driving member, means operated by the rewinding rotation of the drum for automatically releasing the front brake when the spring motor has been rewound to the desired point, thereby automatically disconnecting the drum from the rewinding action of the driving member, a rear brake for yieldingly holding the drum against rotation in an unwinding direction, and lever operated means for releasing the rear brake, said means being adapted to release the rear brake separately but designed to reset both brakes simultaneously.

7. In a device of the class described, a stationary shaft, a drum rotatably mounted thereon, a driving member, a positive one-way clutch through which power is transmitted from the drum to the driving member, a separate yieldable connection through which power is transmitted from the driving member to the drum, and means for automatically making and breaking the driving connection from the driving member to the drum.

8. In a device of the class described, a stationary shaft, a drum rotatably mounted thereon, a driving member, a positive one-way clutch through which power is transmitted from the drum to the driving member, a separate yieldable connection through which power is transmitted from the driving member to the drum, a front brake, a means for automatically setting said brake to make the connection operative between the driving member and drum.

9. In a device of the class described, a stationary shaft, a drum rotatably mounted thereon, a driving member, a positive one-way clutch through which power is transmitted from the drum to the driving member, a separate yieldable connection through which power is transmitted from the driving member to the drum, a front brake, means for automatically setting said brake to make the connection operative between the driving member and drum, and means automatically operated by the rotation of the drum for releasing said brake to break the operative connection between the driving member and drum.

10. In a device of the class described, a stationary shaft, a rotatable drum mounted thereon, a driving member, a brake yieldable connection between the driving member and drum, means for automatically making the connection between the driving member and drum, said means comprising a screw threaded sleeve rotatable with said drum, a screw threaded block adapted to travel thereon and which through suitable connections releases said brake when the drum has been rotated to the desired point.

11. In a starter, a drum, a motor for operating said drum, a front head for said drum, a driving member, positive driving connections between the said head and driving member adapted to be automatically thrown into operative relation on the initial rotation of said drum, said means comprising a member rotatable with said head, a plurality of bifurcated pawls carried by said member, a flanged friction collar rotatably mounted on said shaft, a clutch housing provided with a sleeve rotatably mounted on said collar, an internal gear on said housing, and pins carried by said collar adapted to force said pawls into engagement with said gear when the driving power is transmitted from the head and out of engagement when the driving power is being transmitted from the clutch housing.

12. In a starter, a drum, a motor for operating said drum, a front head for said drum, a driving member, positive driving connections between the said head and driving member adapted to be automatically thrown into operative relation on the initial rotation of said drum, said means comprising a member rotatable with said head, a plurality of bifurcated pawls carried by said member, a flanged friction collar rotatably mounted on said shaft, a clutch housing provided with a sleeve rotatably mounted on said collar, an internal gear on said housing, pins carried by said collar adapted to force said pawls into engagement with said gear when the driving power is transmitted from the head and out of engagement when the driving power is being transmitted from the clutch housing, and yieldable connections between said housing and head for transmitting power from said housing to said head.

13. In a starter, a drum, a motor for operating said drum, a front head for said drum, a driving member, positive driving connections between the said head and driving member adapted to be automatically thrown into operative relation on the initial rotation of said drum, said means comprising a member rotatable with said head, a plurality of bifurcated pawls carried by said member, a flanged friction collar rotatably mounted on said shaft, a clutch housing provided with a sleeve rotatably mounted on said collar, an internal gear on said housing, pins carried by said collar adapted to force said pawls into engagement with said gear when the driving power is transmitted from the head and out of engagement when the driving power is being transmitted from the clutch housing, yieldable connections between said housing and head for transmitting power from said housing to said head, said means comprising a pinion fast to said housing, a brake disk rotatably mounted on said pinion, an internal gear on said head, a plurality of pinions carried by said disk and designed to mesh with the internal gear and the first mentioned pinion, and means for holding said disk against rotation.

14. In a device of the class described, a stationary shaft, a spring motor fast to said shaft, a driving member, means for automatically rewinding said motor, said means comprising a pinion, a brake disk rotatably mounted on said pinion, an internal gear connected to the spring motor, a plurality of comparatively small pinions carried by the brake disk and designed to mesh with the first mentioned pinion and internal gear, and a brake for holding the disk against rotation.

15. In a starter, a stationary shaft, a drum, a driving member, a head for said drum, an internal gear on said head, a pinion, a brake disk, a plurality of small pinions carried by said disk and adapted to constantly mesh with said internal gear and first mentioned pinion, an automatically operated brake for yieldably holding said brake and disk against movement and means for rigidly connecting said first mentioned pinion with said driving member.

16. In a starter, a stationary shaft, a drum, a driving member, a head for said drum, an internal gear on said head, a pinion, a brake disk, a plurality of small pinions carried by said disk and adapted to constantly mesh with said internal gear and first mentioned pinion, an automatically operated brake for yieldably holding said brake disk against movement, and means for rigidly connecting said first mentioned pinion with said driving member, said means comprising a clutch housing on which is non-rotatably mounted a driving member.

17. In a starter, the combination of a casing, a stationary shaft mounted therein, a rotatable drum mounted thereon, a brake band provided with bifurcated lugs within said casing for holding said drum against rotation, and means for operating said band, said means comprising a brake shaft rotatably mounted in said casing, means within said casing operated by said shaft for contracting said band on the rotation of said shaft, and means for rotating said shaft.

18. In a device of the class described a one-way safety clutch comprising a rotatable member carrying a plurality of bifurcated pawls, a frictional collar carrying a plurality of pins designed to mesh with the bifurcations in said pawls and a second member in frictional engagement with said collar provided with an internal gear, the said collar, due to its frictional resistance, being adapted through its pin connection with the pawls to throw said pawls into mesh with said gear when the power is being transmitted from the first member to the second member and adapted to throw the pawls out of mesh when it is attempted to transmit power from the second member to the first member.

19. In an external contracting brake band, a rotatable shaft provided with means for contracting or releasing said brake on each partial rotation thereof, a ratchet non-rotatably mounted on said shaft, a pair of links pivoted to said shaft normally set at right angles each provided with a pawl designed to engage said ratchet, whereupon the movement of one of said links sets said brake, and a progressive movement of the other link releases said brake.

20. In an external contracting brake band, a rotatable shaft provided with means for contracting or releasing said brake on each partial rotation thereof, a ratchet non-rotatably mounted on said shaft, a pair of links pivoted to said shaft normally set at right angles each provided with a pawl designed to engage said rachet, whereupon the movement of one of said links sets said brake, a progressive movement of the other link releases said brake, and means for operating said links.

21. In a starter, the combination of a casing, a stationary shaft mounted therein, a drum rotatably mounted on the shaft, a spring motor for rotating said drum, a front and rear brake, the front brake in use being normally released while the rear brake is normally set, the latter being adapted to hold the drum against rotation in an unwinding direction, lever operated means for releasing the rear brake, a driving member, driving connections between the driving member and drum, means for automatically setting the front brake to permit the driving member to rotate the drum, and means for automatically releasing the front brake when the motor has been rewound to a predetermined point.

22. In a starter, the combination of a casing, a stationary shaft mounted therein, a drum rotatably mounted on the shaft, a spring motor for rotating said drum, a front and rear brake, the front brake in use being normally released while the rear brake is normally set, the latter being adapted to hold the drum against rotation in an unwinding direction, lever operated means for releasing the rear brake, driving member, driving connections between the driving member and drum, means for automatically setting the front brake to permit the driving member to rotate the drum, means for automatically releasing the front brake when the motor has been rewound to a predetermined point, and means for readily adjusting said releasing means.

23. The combination of a shaft, a spring motor, a driving member, driving connections between said driving member and spring motor, means for automatically making said connections while said motor is being wound, means for automatically breaking said connection when the motor has been wound to the desired point, a positive driving connection between the spring motor and driving member, and means for automatically breaking said connection when the driving member is rewinding the spring motor.

24. In a starter, the combination of a shaft, a spring motor, a driving member, driving connections between said driving member and spring motor, means for automatically making said connection while said motor is being wound, means for automatically breaking said connection when the motor has been wound to the desired point, a positive driving connection between the spring motor and driving member, and means for automatically breaking said connection when the driving member is rewinding the spring motor.

25. In a starter, the combination of a stationary shaft, a spring motor, a front and rear brake, the front brake in use being normally released while the rear brake is normally set, the latter being adapted to hold the spring motor against rewinding, lever operating means for releasing the rear brake, a driving member, driving connections between the driving member a spring motor, means for automatically setting the front brake to permit the driving member to rotate the spring motor and means for automatically releasing the front brake when the motor has been rewound.

26. In a starter, the combination of a stationary shaft, a spring motor, a front and rear brake, the front brake in use being normally released while the rear brake is normally set, the latter being adapted to hold the spring motor against rewinding, lever operated means for releasing the rear brake, a driving member, driving connections between the driving member and spring motor, means for automatically setting the front brake to permit the driving member to rotate the spring motor, means for automatically releasing the front brake when the motor has been rewound, and means for readily adjusting said releasing means.

27. In a device of the class described, a shaft, a spring motor, a driving member, a positive one-way clutch through which power is transmitted from the spring motor to the driving member, a separate yieldable connection through which power is transmitted from the driving member to the spring motor for rewinding the latter, a brake, and means for automatically setting said brake to make the connection operative between the driving member and spring motor.

28. In a device of the class described, a shaft, a spring motor, a driving member, a positive one-way clutch through which power is transmitted from the spring motor to the driving member, a separate yieldable connection through which power is transmitted from the driving member to the spring motor for rewinding the latter, a brake, means for automatically setting said brake to make the connection operative between the driving member and spring motor, and means automatically operated by the rewinding of said motor for breaking the connection between the driving member and spring motor.

29. In a device of the class described, a spring motor, a driving member, a positive automatically operated clutch mechanism between the motor and driving member, a yieldable connection between the driving member and motor, means for yieldingly holding the latter in operative relation while the spring motor is being rewound by the power transmitted through the driving member, and means operated by the motor for automatically disconnecting the spring motor from the driving member when rewound to the desired point.

30. In a device of the class described, a spring motor, a driving member, a positive automatically operated clutch mechanism between the motor and driving member, a yieldable connection between the driving member and motor, means for yieldingly holding the latter in operative relation while the spring motor is being rewound by the power transmitted through the driving member, means operated by the motor for automatically disconnecting the spring motor from the driving member when rewound to the desired point, and means for normally holding the spring motor against unwinding.

31. In a one-way clutch, a shaft, a driving member, a frictional collar rotatably mounted on the shaft, a driven member rotatably mounted on the collar and provided with an internal gear, pawls carried by said driving member and means carried by said collar for throwing said pawls into and out of mesh with said gear.

32. In a starter, the combination of a drum, a spring motor for operating the drum, positive driving connections driven by an automatically put in operative relation by the rotation of the drum, separate driving connections for rewinding the drum, a front brake for yieldingly holding the latter connections in operative relation, automatically operated means for successively setting and releasing said brake for making and breaking the latter connections, a rear brake for normally holding the drum against rotation to retain the stored up energy and lever operated means for releasing the rear brake said means on reverse movement being adapted to set both front and rear brakes simultaneously.

33. In a device of the class described, a drum, a spring motor for operating said drum, a driving member, a positive automatically operated clutch mechanism between the driving member and drum, a yieldable connection between the driving member and drum and a brake for yieldably holding the latter connections in operative relation while the drum is being driven by the power transmitted through the driving member.

34. In a device of the class described, a drum, a spring motor for operating said drum, a driving member, a positive automatically operated clutch mechanism between the driving member and drum, a yieldable connection between the driving member and drum, an automatically operated brake for yieldingly holding the latter connections in operative connection while the spring motor is being rewound by the power transmitted through the driving member, and means operated by the rewinding rotation of the drum for automatically releasing the front brake when the spring motor has been rewound to the desired point, thereby automatically disconnecting the drum from the rewinding action of the driving member.

35. In a device of the class described, a shaft, a drum a driving member, a positive one-way clutch through which power is transmitted from the drum to the driving member, a separate yieldable connection through which power is transmitted from the driving member to the drum, and means for making and breaking the driving connection from the driving member to the drum.

36. In a device of the class described, a shaft, a drum, a driving member, a positive one-way clutch through which power is transmitted from the drum to the driving member, a separate yieldable connection through which power is transmitted from the driving member to the drum, a brake, means for setting said brake to make the connection operative between the driving member and drum, and means for releasing said brake to break the operative connection between the driving member and drum.

37. In a starter, a drum, a motor for operating said drum, a front head for said drum, a driving member, positive driving connections between the said head and driving member adapted to be automatically thrown into operative relation on the initial rotation of said drum, said means comprising a member rotatable with said head, a plurality of bifurcated pawls carried by said member, a gear, a friction collar, provided with pins adapted to force said pawls into engagement with said gear when the driving power is transmitted from the head and out of engagement when the driving power is being transmitted in the reverse direction.

38. In a starter, a shaft, a drum, a driving member, a head for said drum, an internal gear on said head, a pinion, a brake disk, a plurality of small pinions carried by said disk and adapted to constantly mesh with said internal gear and first mentioned pinion, a brake for yieldably holding said disk against movement and means for rigidly connecting said first mentioned pinion with said driving member.

39. In a starter, a shaft, a drum, a driving member, an internal gear on said drum, a pinion, a brake disk, a plurality of small pinions carried by said disk and adapted to constantly mesh with said internal gear and first mentioned pinion, an automatically operated brake for yieldably holding said brake disk against movement, and means for rigidly connecting said first mentioned pinion with said driving member.

40. In a starter, the combination of a casing, a shaft mounted therein, a drum mounted in said casing, a brake band within said casing for holding said drum against rotation, and means for operating said band, said means comprising a brake shaft rotatably mounted in said casing, means within said casing operated by said shaft for contracting said band on the rotation of said shaft and means for rotating said shaft.

41. In a device for starting an internal combustion engine the combination of a drum, a spring motor, a brake, a driving member, a frictional trip, a one-way safety clutch between the drum and driving member and adapted to be automatically thrown into positive connection when the spring motor is transmitting power to the driving member and to be automatically disengaged by the same means when power is applied to the driving member by the engine said means being characterized by said brake and frictional trip member.

42. In a device of the class described a one-way safety clutch comprising a gear, a rotatable member carrying plurality of bifurcated pawls, a frictional collar carrying a plurality of pins designed to mesh with the bifurcations in said pawls, the said collar, due to its frictional resistance, being adapted through its pin connection with the pawls to throw said pawls into mesh with said gear when the power is being transmitted from the first member to the second member and adapted to throw the pawls out of mesh when it is attempted to transmit power from the second member to the first member.

43. In a starter, the combination of a casing, a shaft, a drum, a motor for rotating said drum, a front and rear brake, the front brake in use being normally released while the rear brake is normally set, the latter being adapted to hold the drum against rotation in an unwinding direction, means for releasing and setting said brakes, a driving member and driving connections between the driving member and drum.

44. In a starter, the combination of a casing, a stationary shaft mounted therein, a drum rotatably mounted on the shaft, a spring motor for rotating said drum, a front and rear brake, the front brake in use being normally released while the rear brake is normally set, the latter being adapted to hold the drum against rotation in an unwinding direction, lever operated means for releasing the rear brake, driving member, driving connections between the driving member and drum and means for setting the front brake to permit the driving member to rotate the drum.

45. In a starter, the combination of a spring motor, a front and rear brake, one brake in use being normally released while the other is normally set, a driving member, driving connections between the driving member and spring motor, means for setting one brake to permit the driving member to rotate the spring motor and means for releasing the other brake when the motor has been rewound.

46. In a starter, the combination of a stationary shaft, a spring motor, a front and rear brake, the front brake in use being normally released while the rear brake is normally set, the latter being adapted to hold the spring motor against rewinding, lever operated means for releasing the rear brake, a driving member, driving connections between the driving member and spring motor, means for setting the front brake to permit the driving member to rotate the spring motor and means for releasing the front brake when the motor has been rewound.

47. In a device of the class described, a shaft, a spring motor, a driving member, a positive one-way clutch through which power is transmitted from the spring motor to the driving member, a separate yieldable connection through which power is transmitted from the driving member to the spring motor for rewinding the latter, a brake, and means for setting said brake to make the connection operative between the driving member and spring motor.

In witness whereof, I hereunto subscribe my name to this specification in the presence of two witnesses.

FLOYD JOHNSTON.

Witnesses:
O. M. HOBBS,
L. C. DREESEN.